Dec. 21, 1954  J. A. RIORDAN  2,697,583
TOOL FOR SPREADING SPLIT ENDS OF CONNECTING RODS
Original Filed Sept. 27, 1948
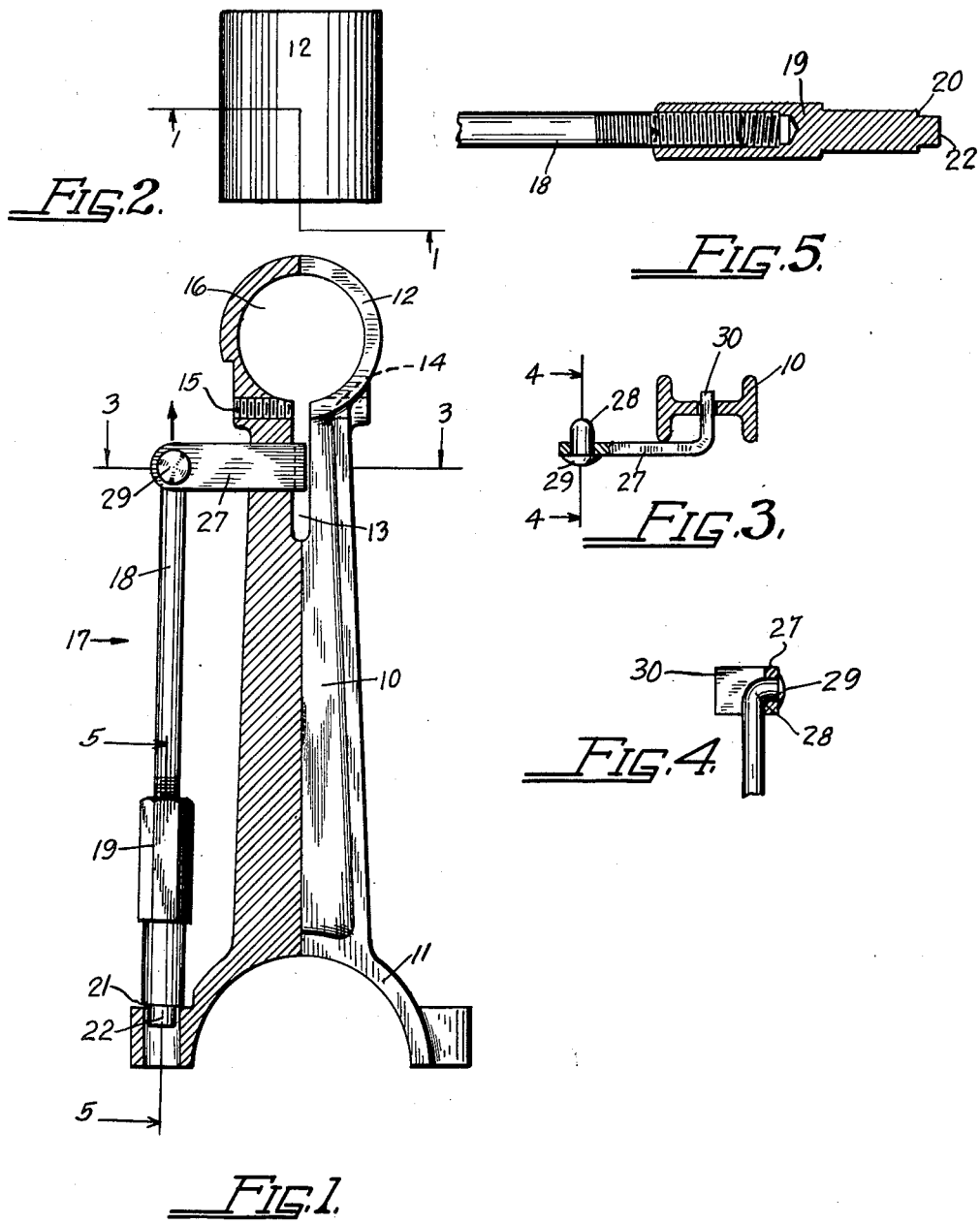
INVENTOR.
John A. Riordan
BY
Martin E. Anderson
ATTORNEY

United States Patent Office

2,697,583
Patented Dec. 21, 1954

2,697,583

TOOL FOR SPREADING SPLIT ENDS OF CONNECTING RODS

John A. Riordan, Denver, Colo., assignor to James T. Clark, Fort Morgan, Colo.

Original application September 27, 1948, Serial No. 51,448, now Patent No. 2,583,392, dated January 22, 1952. Divided and this application December 7, 1951, Serial No. 260,478

3 Claims. (Cl. 254—100)

This invention relates to tools for engine mechanics and more particularly to tools for spreading the split piston pin ends of connecting rods. This application is a division of my copending application, Serial No. 51,448, filed September 27, 1948, now Patent No. 2,583,392, granted January 22, 1952, which latter discloses the subject matter of this application, but does not claim same.

In the assembly or disassembly of certain types of connecting rods to or from their pistons, the piston pin which connects the two members is usually held tightly by an end of the connecting rod necessitating driving, or otherwise forcing, the pin through the connecting rod to effect its removal or assembly relative thereto.

The principal object of this invention is to provide a tool which will spread the split ends of connecting rods of this class to thus facilitate engine assembly or disassembly.

Another object is to provide a tool which may be employed in cramped quarters within the engine.

Another object is to provide a tool which is equally useful where assembly or disassembly is effectuated with the connecting rod and piston removed from the engine.

Another object is to provide an extremely simple tool, having few parts, and which may be manufactured inexpensively.

Further objects, advantages, and salient features will become more apparent from the description to follow, the appended claims, and the accompanying drawing in which:

Figure 1 is a side elevation, partly in section, of a certain type of connecting rod and the tool in operative position thereon, taken on line 1—1, Fig. 2;

Figure 2 is a top plan view of the piston pin end of the connecting rod shown in Fig. 1;

Figure 3 is a section taken on line 3—3, Fig. 1;

Figure 4 is a section taken on line 4—4, Fig. 3; and

Figure 5 is an enlarged section taken on line 5—5, Fig. 1.

Referring in detail to the drawing, there is shown in Figure 1, a conventional connecting rod 10, the cap thereof being omitted, this rod having a journal end 11 which receives the crank pin bearing, and a small end 12 which receives a piston or wrist pin therein, the latter having its ends journaled in piston pin bosses of the piston, all as well understood in the art. The small end 12 has a slot 13, and a hole 14 for receiving a clamp bolt (not shown) which has one end thereof engageable with threads 15. When the piston and connecting rod are assembled, the clamp bolt draws end 12 tightly about the wrist pin, thus securing the parts together. Usually, the wrist pin is provided with a slot in one side thereof through which the clamp bolt passes to preclude end motion between the wrist pin and connecting rod, all as also well known in the art.

The bore 16 of end 12 is usually slightly smaller than the wrist pin so that the wrist pin will fit therein with a force or drive fit and it is customary practice when assembling the wrist pin to the connecting rod to either press, or drive, with a hammer and suitable punch, the wrist pin through the bore. This is a cumbersome procedure and not fully satisfactory because the slot in the wrist pin must be parallel with opening 14 and in event the wrist pin is inserted misaligned it is difficult to rotate it in bore 16. It is not uncommon, also, where misalignment occurs, to withdraw the wrist pin and repeat the procedure several times until the wrist pin is properly aligned to receive the clamp bolt within its slot, all of which causes unnecessary disconcertment to the mechanic.

This cumbersome procedure is eliminated by tool 17 which comprises a rod 18 having a jack screw 19 threaded on one end thereof, the latter having an abutment 20 which engages a surface 21 of the connecting rod, which, as illustrated, is the surface against which one of the heads of the connecting rod bolts normally engage.

Jack screw 19 also has an end 22 which enters one of the connecting rod bolt holes to prevent the jack screw from slipping sidewise. The opposite end of the rod 18 carries a lever 27 pivoted thereto at one end by a bent portion 28 riveted at 29. The other end of lever 27 has a bent portion 30 which is received within slot 13. When rod 18 is raised by jack screw 19, lever 27 is oscillated and the end 30 cams the slot to a wider opening, thus increasing the diameter of bore 16 and permitting easy insertion or withdrawal of the wrist pin by mere manipulation with the fingers of the hand.

In the claims, "connecting rod" is to be construed to mean the connecting rod proper or any abutment member associated therewith with which the jack screw may engage, within the spirit of the invention.

Having described the invention, what is claimed as new is:

1. A tool for spreading the wrist pin end of an engine connecting rod of the type having a slot adjacent a wrist pin receiving hole at one end of the connecting rod, the slot extending longitudinally of the connecting rod, the connecting rod having a surface forming a part of the connecting rod adjacent a journal portion at the other end thereof, comprising: an elongated straight rod, embodying extensible means for changing its length and having means on one end for abutting said surface and preventing slippage therefrom upon axial extension of said straight rod, and a lever pivoted at one end thereof to the other end of said straight rod, the other end of the lever being flattened and of greater width than the slot extending substantially perpendicular to the body of the lever and of a thickness less than the width of the slot to permit it to enter the slot and to widen it when said rod is extended.

2. A tool for spreading the wrist pin end of an engine connecting rod of the type having a slot adjacent a wrist pin receiving hole at one end of the connecting rod, the slot extending longitudinally of the connecting rod, comprising, a lever having cam means extending perpendicularly from one end thereof constructed to enter said slot and widen it upon rotation of the lever, and extensible means comprising a straight bar pivoted at one end to the other end of the lever and provided at its other end with a threaded section, and an elongated nut in operative engagement with the threaded section, the other end having means for abutting a projecting portion of a connecting rod.

3. A tool for spreading the wrist pin end of an engine connecting rod of the type having an elongated slot extending radially from a wrist pin receiving hole and provided at its other end with a perforated lateral projection, said tool comprising a lever provided at one end with a flattened cam member formed to enter the elongated slot, said cam member extending at right angles to the body of the lever, a bar having one end pivoted to the free end of the lever, the other end of the bar having a threaded section, and an elongated nut operatively connected with the threaded section, the outer end of said nut being provided with means for engaging said lateral projection, whereby when the nut is rotated on the rod in a direction to extend their combined length the cam will be turned in the slot spreading the same.

References Cited in the file of this patent

UNITED STATES PATENTS

| Number | Name | Date |
|---|---|---|
| 1,041,660 | Nelson | Oct. 15, 1912 |
| 1,171,320 | Chroninger | Feb. 8, 1916 |
| 2,331,683 | Heindricks | Oct. 12, 1943 |
| 2,464,103 | Swenson | Mar. 8, 1949 |
| 2,583,392 | Riordan | Jan. 22, 1952 |